Figure 1:
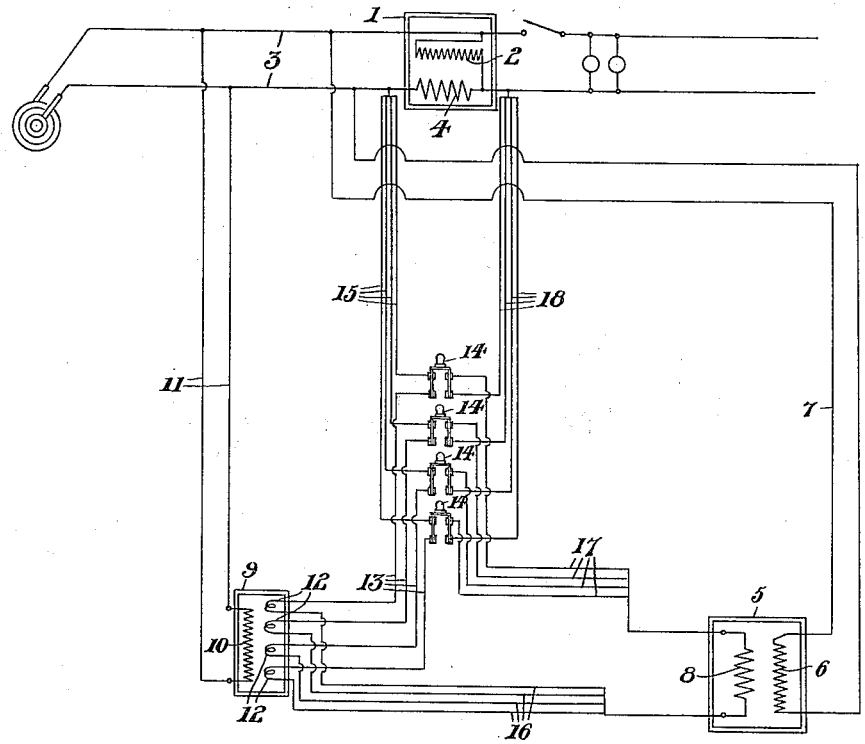

H. J. BLAKESLEE.
ELECTRICAL TESTING APPARATUS.
APPLICATION FILED JAN. 19, 1915.

1,159,354.

Patented Nov. 9, 1915.

Witnesses

Inventor
H. J. Blakeslee
By
Attorney

UNITED STATES PATENT OFFICE.

HENRY J. BLAKESLEE, OF HARTFORD, CONNECTICUT.

ELECTRICAL TESTING APPARATUS.

1,159,354.  Specification of Letters Patent.  Patented Nov. 9, 1915.

Substitute for application Serial No. 527,041, filed November 9, 1909. This application filed January 19, 1915. Serial No. 3,068.

*To all whom it may concern:*

Be it known that I, HENRY J. BLAKESLEE, a citizen of the United States, and resident of Hartford, in the county of Hartford, in the State of Connecticut, have invented new and useful Improvements in Electrical Testing Apparatus, of which the following, taken in connection with the accompanying drawings, is a full, clear, and exact description.

This invention relates to certain improvements in electrical testing apparatus of the class set forth in my Patent No. 950,714, issued March 1, 1910, except that in the present case the testing circuits are divided as far as possible into multiple sections in which the resistances are approximately inversely proportioned to the currents they are adapted to carry, this application being a substitute of my former application, Serial No. 527,041, filed Nov. 9, 1909.

In the apparatus commonly employed for similar purposes to quickly determine the proper position of the regulating elements in order to obtain the desired current it is necessary to use an indicating instrument or to time the moving element of the standardized meter.

The principal reason for this is that the electromotive force used in the circuits in which the series coils of the instruments are connected is so low that the effect of a variable contact resistance and variable impedance of other parts of the circuit makes it impracticable to predetermine the currents which will result from definite connections and positions of certain parts of the apparatus.

Another result of using such low electromotive force is a comparatively lower power factor in the circuit containing the instrument series coils.

The objects therefore of my present invention are:—to retain the compactness which the use of a low voltage testing current allows; to arrange the controlling parts in such manner that the testing current can be predetermined; and to insure a power factor of high value under all conditions of load.

It is evident that compactness requires low electromotive force in the instrument circuit in order that there may be small expenditure of heat in the leads and controlling resistance while a high power factor and ability to predetermine the current require comparatively high electromotive force.

The results which best satisfy both requirements are obtained by dividing the instrument circuit so far as possible into multiple sections having resistances approximately inversely proportioned to the currents they are to carry. This compactness is obtained by supplying the current to the series coils of the instruments under comparison from a low voltage secondary of a potential transformer and by designing the resistance units so as to comprise the leads.

The result of predetermining the current is obtained by arranging the resistance units of the secondary of the transformer in multiple and by using an electromotive force sufficiently high so that the potential drop in the instrument coils is negligible. By this arrangement I obtain a high power factor.

Other objects and uses will be brought out in the following description.

Figure 2:
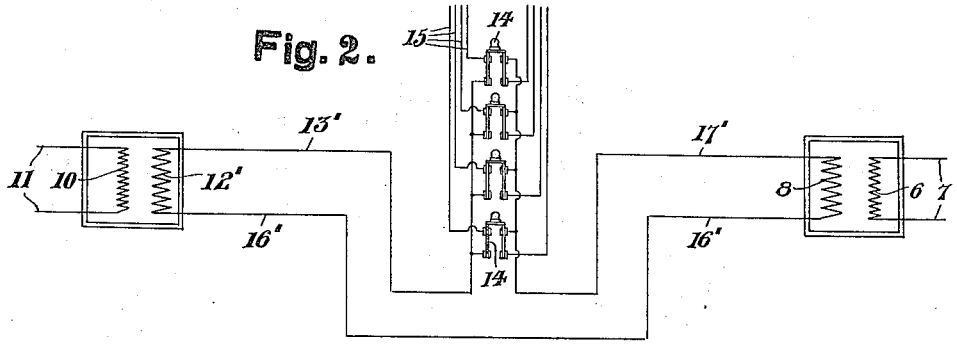

In the drawings: Figure 1 is a diagrammatic view of one form of my invention as used in testing watt hour meters. Fig. 2 is a similar diagrammatic view of portions of a slightly modified form of apparatus for the same purpose in which a single secondary winding for the transformer is used in place of the separate coils shown in Fig. 1.

In illustrating the operation of this apparatus a watt hour meter —1— is shown as having its potential coil —2— connected in the usual manner across a working circuit —3— and its current coil, as —4—, connected in series in one side of the same circuit. A standardized meter —5— is also shown as having its potential winding —6— electrically connected by wires —7— across the working circuit —3— and its series winding, as —8—, adapted to be connected in a manner hereinafter described in the same side of said circuit as the series winding —4—.

Transformer —9— has its primary winding —10— connected by wires —11— across the circuit —3— while its secondary is divided into a plurality of, in this instance four coils or sections —12— preferably of like electromotive force having one side thereof connected by wires —13— to the corresponding sides of separate double pole switches —14—, the same sides of said switches being connected by flexible resistance leads or electric resistors —15— to the side of the circuit —3— in which the series winding —4— of the meter under test is connected.

The opposite sides of the coils —12— are connected by leads —16— to one end of the series coil of the meter under test while the opposite sides of the switches —14— are connected by leads —17— to the opposite end of the same coil and are also connected by resistance leads or electric resistors —18— to the same side of the circuit —3— as the leads —15— but at the opposite end of the series coil —4—.

The conductors of the multiple leads —15— and —18— may be made of any suitable electric resistance material (preferably German silver) so as to constitute in effect flexible rheostats which serve the triple purpose of dissipating energy; rendering the apparatus more compact and allowing such apparatus to be more easily and speedily connected for testing. The testing circuit is therefore divided into multiple sections, the resistances of which are approximately inversely proportionate to the currents they are adapted to carry while the leads which are adapted to be connected to the meters are collected in the form of flexible cables or multiple conductors each of predetermined resistance capable of being connected by its corresponding switch —14— in series with the series coils of the meters, so that any predetermined current within the range provided for by the testing apparatus may be used in testing the meter by closing the corresponding switch. By this arrangement the ohmic drop in potential in the instrument circuit which might interfere with the predetermination of current under various conditions is reduced to a minimum.

In Fig. 2 I have shown the secondary of the transformer as consisting of a single coil having one end connected by a wire —13'— to one side of the switches —14— and its other end connected by a wire —16'— to the series winding —8— which in turn is connected by a single wire —17'— to the opposite side of the switches —14—. Otherwise this modification is the same as that shown in Fig. 1.

If single conductor leads in connection with a rheostat of multiple sections were used instead of the resistance leads which I specify, then the potential drop in such single conductor leads would be proportional to the current flowing and this fact would seriously affect the availability of the apparatus because the currents flowing with all resistances in use would not be closely equal to the sum of the currents flowing with individual resistances in use.

By the arrangements of leads composed of resistance material in sections I eliminate as far as possible the portions of the circuit which are not subdivided and reduce to a minimum the potential drop which would interfere with the sum of the individual currents being equal to total current, and the apparatus is practically available.

The entire apparatus is easily portable and is placed compactly in a suitable case so as to be carried by hand from place to place when tests are to be made.

In making the tests the leads or cables are readily attached to the proper terminals or binding parts of the instrument to be tested and one or more of the switches —14— are then closed according to the predetermined current which may be required for such test.

What I claim is:—

Apparatus for testing electric meters, comprising, in combination, the secondary winding of a transformer, the series winding of a standardized meter adapted to be in circuit with said secondary winding, separate leads each divided into a multiplicity of sections, and each section having an electrical resistance proportioned approximately inversely to the current it is to carry, and separate devices for connecting and disconnecting the resistance sections in and from the secondary transformer.

In witness whereof I have hereunto set my hand this fourteenth day of January, 1915.

HENRY J. BLAKESLEE.

Witnesses:
H. A. BLAKESLEE,
ROGER H. BLAKESLEE.